(12) United States Patent
Hu et al.

(10) Patent No.: US 9,397,840 B2
(45) Date of Patent: Jul. 19, 2016

(54) DIGITAL CERTIFICATE AUTOMATIC APPLICATION METHOD, DEVICE AND SYSTEM

(71) Applicant: China IWNCOMM Co., Ltd., Shaanxi (CN)

(72) Inventors: Yanan Hu, Shaanxi (CN); Manxia Tie, Shaanxi (CN); Weigang Tong, Shaanxi (CN); Bianling Zhang, Shaanxi (CN); Zhenhai Huang, Shaanxi (CN); Lian Jian, Shaanxi (CN); Peng Yuan, Shaanxi (CN)

(73) Assignee: China IWNCOMM Co., Ltd., Shaanxi (CN)

( * ) Notice: Subject to any disclaimer, the term of this patent is extended or adjusted under 35 U.S.C. 154(b) by 0 days.

(21) Appl. No.: 14/396,973

(22) PCT Filed: Apr. 25, 2013

(86) PCT No.: PCT/CN2013/074735
§ 371 (c)(1),
(2) Date: Oct. 24, 2014

(87) PCT Pub. No.: WO2013/159723
PCT Pub. Date: Oct. 31, 2013

(65) Prior Publication Data
US 2015/0333916 A1    Nov. 19, 2015

(30) Foreign Application Priority Data
Apr. 25, 2012 (CN) .......................... 2012 1 0124061

(51) Int. Cl.
G06F 21/00 (2013.01)
H04L 9/32 (2006.01)
H04L 29/06 (2006.01)

(52) U.S. Cl.
CPC .......... *H04L 9/3268* (2013.01); *H04L 63/0823* (2013.01)

(58) Field of Classification Search
CPC .............................. H04W 88/08; H04L 9/3268
See application file for complete search history.

(56) References Cited

U.S. PATENT DOCUMENTS 6,675,296 B1 * 1/2004 Boeyen ................. H04L 9/3263
                                                    713/156
2002/0147920 A1 * 10/2002 Mauro ................. G06Q 20/367
                                                    726/26

(Continued)

FOREIGN PATENT DOCUMENTS

CN     101521883 A    9/2009
CN     101815071 A    8/2010

(Continued)

OTHER PUBLICATIONS

International Search Report issued in PCT/CN2013/074735, mailed Aug. 15, 2013.

(Continued)

*Primary Examiner* — Morshed Mehedi
(74) *Attorney, Agent, or Firm* — Greer Burns & Crain Ltd.

(57) ABSTRACT

In a digital certificate automatic application method, device and system, a digital certificate applicant notifies a digital certificate issuer of supported digital certificate generation methods. If a digital certificate issued by the issuer is available, then the issuer is notified of the existing digital certificate information. Otherwise, the issuer is notified of the certificate information required to be contained in a newly applied digital certificate. The issuer selects a digital certificate generation method from the digital certificate generation methods supported by the applicant, and notifies the applicant. If the applicant must apply for a new digital certificate, then the new digital certificate information is generated and the applicant is notified. Otherwise, the applicant is notified of the invalid digital certificate information. The applicant determines the digital certificate to be used according to the notification from the issuer. The present application achieves automatic application, updating and issuing of a digital certificate.

20 Claims, 3 Drawing Sheets

(56) References Cited

U.S. PATENT DOCUMENTS

| | | | | |
|---|---|---|---|---|
| 2004/0073814 A1* | 4/2004 | Miyazaki | H04L 9/3255 | 726/6 |
| 2004/0117726 A1* | 6/2004 | Inada | G06F 21/64 | 715/255 |
| 2005/0005097 A1* | 1/2005 | Murakawa | H04L 63/0442 | 713/156 |
| 2008/0109653 A1* | 5/2008 | Yokohama | H04L 9/3263 | 713/156 |
| 2009/0003603 A1* | 1/2009 | Wessel, Jr. | G06F 21/10 | 380/255 |
| 2010/0275012 A1* | 10/2010 | Kido | H04L 63/0823 | 713/156 |
| 2011/0302411 A1* | 12/2011 | Liang | H04L 63/0823 | 713/158 |
| 2014/0317401 A1* | 10/2014 | Lee | H04L 9/3268 | 713/156 |
| 2015/0095995 A1* | 4/2015 | Bhalerao | H04L 63/0823 | 726/6 |

FOREIGN PATENT DOCUMENTS

| | | |
|---|---|---|
| CN | 102118374 A | 7/2011 |
| CN | 102624531 A | 8/2012 |

OTHER PUBLICATIONS

IEEE Std 802.11i-2004; IEEE Standard for Information Technology; Telecommunications and information exchange between systems—Local and metropolitan area networks—Specific requirements Part 11: Wireless LAN Medium Access Control (MAC) and Physical Layer (PHY) specifications; Amendment 6: Medium Access Control (MAC) Security Enhancements; Jul. 23, 2004.

GB 15629.11-2003/XG1-2006; Information technology; Telecommunications and information exchange between systems—Local and metropolitan area networks—Specific requirements—Part 11: Wireless LAN Medium Access Control (MAC) and Physical Layer (PHY) specifications; Amendment 1; Jan. 27, 2006.

\* cited by examiner

DIGITAL CERTIFICATE AUTOMATIC APPLICATION METHOD, DEVICE AND SYSTEM

This application is a US National Stage of International Application No. PCT/CN2013/074735, filed on Apr. 25, 2013, designating the United States and claiming priority to Chinese Patent Application No. 201210124061.X, filed with the Chinese Patent Office on Apr. 25, 2012 and entitled "digital certificate automatic application method, device and system", the content of which is hereby incorporated by reference in its entirety.

FIELD

The present invention relates to the field of network security technologies and particularly to a method for automatically applying for a digital certificate, device and system thereof.

BACKGROUND

Digital certificates are necessary to a variety of technologies and devices in existing network environments, wherein identity authentication, data encryption and other functions can be performed with the digital certificates, but there is a need of a solution to a support of automatically applying for, updating and issuing a digital certificate.

Taking wireless local area network technologies as an example, the wireless local area network technologies relate to two categories of security solutions: firstly the Wireless Local Area Network (LAN) Authentication and Privacy Infrastructure (WAPI) is a security solution of wireless local area networks proposed in the Chinese National Standard GB15629.11 of Wireless Local Area Networks; and secondly the Robust Security Network (RSN) is a security solution defined in the Institute of Electrical and Electronics Engineers (IEEE) Standard IEEE802.11i of Wireless Local Area Networks. The common characteristic between them lies in that an authentication process can be performed by a digital certificate solution based upon the public key cipher architecture, and before then authentication process is performed by the digital certificate solution based upon the public key cipher architecture, a station (STA) and an Access Point (AP) which are digital certificate applicants shall apply for in advance digital certificates, by which their identities can be identified, from a Certificate Authority (CA) as a digital certificate issuer, and then install the digital certificates obtained into their devices.

In order to automatically apply for, update and issue different types of digital certificates by exchanging information, what information needs to be provided by the digital certificate applicant to the digital certificate issuer in digital certificate applying and updating processes, or what information needs to be provided by the digital certificate issuer to the digital certificate applicant in a digital certificate issuance process will directly influence whether the security mechanism of the wireless local area network technology can work effectively.

However how to automatically apply for, update and issue a digital certificate by exchanging information goes beyond the design of the standard of wireless local area networks, and there has been absent so far a working solution to automatically applying for, updating and issuing a digital certificate.

SUMMARY

Embodiments of the invention provide a method for automatically applying for a digital certificate, device and system so as to implement automatically applying, updating and issuing of a digital certificate.

An embodiment of the invention provides a method for automatically applying for a digital certificate including:

notifying, by a digital certificate applicant, a digital certificate issuer of digital certificate generation schemes supported by the digital certificate applicant, and if the digital certificate applicant determines that a digital certificate issued by the digital certificate issuer has been possessed, then the digital certificate applicant further notifying the digital certificate issuer of information of the digital certificate possessed by the digital certificate applicant, or if the digital certificate applicant determines that no digital certificate issued by the digital certificate issuer has been possessed, then the digital certificate applicant further notifying the digital certificate issuer of certificate information to be included in a applied new digital certificate;

selecting, by the digital certificate issuer, one of the digital certificate generation schemes supported by the digital certificate applicant and notifying the digital certificate applicant of the selected digital certificate generation scheme, and generating, by the the digital certificate issuer, information of the new digital certificate from the selected digital certificate generation scheme and the certificate information notified of by the digital certificate applicant and notifying the digital certificate applicant of the information of the new digital certificate upon determining that the digital certificate applicant needs to apply for the new digital certificate, or notifying the digital certificate applicant of invalid digital certificate information upon determining that the digital certificate applicant does not need to apply for any new digital certificate; and determining, by the digital certificate applicant, from the notification of the digital certificate issuer the digital certificate for use.

An embodiment of the invention further provides a digital certificate application device including:

a first notification unit configured to notify a digital certificate issuer of digital certificate generation schemes supported by the digital certificate application device;

a second notification unit configured, upon determining that the digital certificate application device has possessed a digital certificate issued by the digital certificate issuer, to notify the digital certificate issuer of information of the digital certificate possessed by the digital certificate application device, or upon determining that the digital certificate application device possesses no digital certificate issued by the digital certificate issuer, to notify the digital certificate issuer of certificate information to be included in a applied new digital certificate; and a certificate determination unit configured to determine from a notification of the digital certificate issuer a digital certificate for use.

An embodiment of the invention further provides a digital certificate issuing device including:

a first notification unit configured to select one of digital certificate generation schemes, supported by a digital certificate applicant, notified of by the digital certificate applicant and to notify the digital certificate applicant of the selected digital certificate generation scheme; and a second notification unit configured to generate information of a new digital certificate from the selected digital certificate generation scheme and the certificate information notified of by the digital certificate applicant and notify the digital certificate applicant of the information of the new digital certificate upon determining that the digital certificate applicant needs to apply for the new digital certificate, and to notify the digital certificate applicant of invalid digital certificate information upon determining that the digital certificate applicant does not need to apply for any new digital certificate.

An embodiment of the invention further provides an automatic digital certificate application system including:

a digital certificate applicant configured to notify a digital certificate issuer of digital certificate generation schemes supported by the digital certificate applicant, if it is determined that a digital certificate issued by the digital certificate issuer has been possessed, to further notify the digital certificate issuer of information of the digital certificate possessed by the digital certificate applicant, or if it is determined that no digital certificate issued by the digital certificate issuer has been possessed, to further notify the digital certificate issuer of certificate information to be included in a applied new digital certificate, and to determine from a notification of the digital certificate issuer a digital certificate for use; and the digital certificate issuer configured to select one of the digital certificate generation schemes supported by the digital certificate applicant and notify the digital certificate applicant of the selected digital certificate generation scheme, and to generate information of the new digital certificate from the selected digital certificate generation scheme and the certificate information notified of by the digital certificate applicant and notify the digital certificate applicant of the information of the new digital certificate upon determining that the digital certificate applicant needs to apply for the new digital certificate, or to notify the digital certificate applicant of invalid digital certificate information upon determining that the digital certificate applicant does not need to apply for any new digital certificate.

With the automatic digital certificate application method and system according to the embodiments of the invention, there are the following advantageous effects: with information exchange, a digital certificate applicant can automatically applies for different types of wireless local area network digital certificates; the digital certificate applicant automatically updates the different types of wireless local area network digital certificates; and a digital certificate issuer automatically determines a certificate status of the digital certificate applicant and issues a valid digital certificate to the digital certificate applicant.

DETAILED DESCRIPTION OF THE EMBODIMENTS

Figure 1:
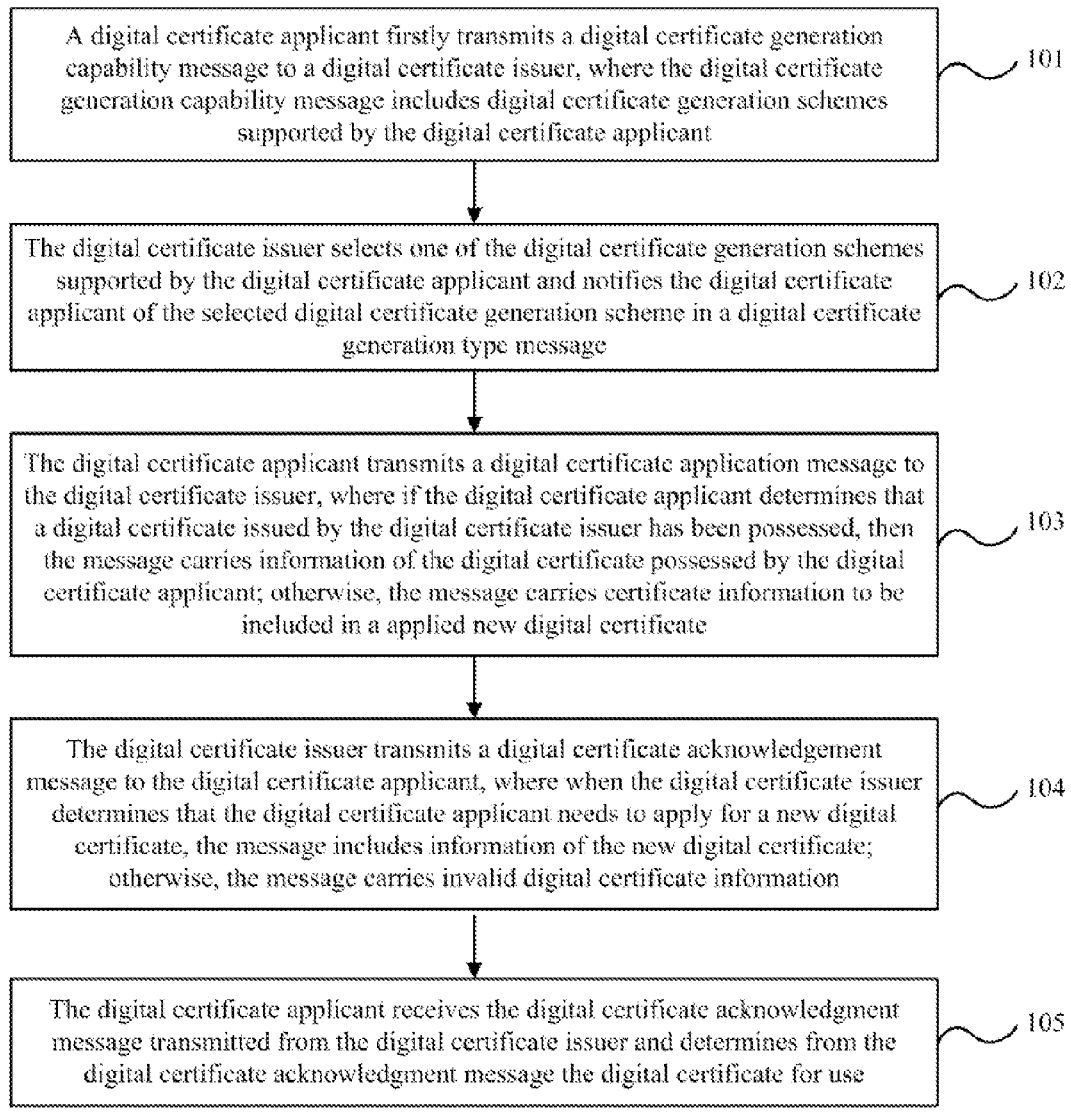
FIG. 1 is a flow chart of a method for automatically applying for a digital certificate according to a first embodiment of the invention.

A method for automatically applying for a digital certificate and system thereof according to the invention will be described below in details with reference to the drawings and embodiments thereof.

Embodiments of the invention provide a method for automatically applying for a digital certificate, device and system so as to implement automatically applying, updating and issuing of a digital certificate. The method includes:

A digital certificate applicant notifies a digital certificate issuer of digital certificate generation schemes supported by the digital certificate applicant, and if the digital certificate applicant determines that a digital certificate issued by the digital certificate issuer has been possessed, then the digital certificate applicant further notifies the digital certificate issuer of information of the digital certificate possessed by the digital certificate applicant, or if the digital certificate applicant determines that no digital certificate issued by the digital certificate issuer is possessed, then the digital certificate applicant further notifies the digital certificate issuer of certificate information to be included in a applied new digital certificate;

The digital certificate issuer selects one of the digital certificate generation schemes supported by the digital certificate applicant and notifies the digital certificate applicant of the selected digital certificate generation scheme, and generates information of the new digital certificate according to the selected digital certificate generation scheme and the certificate information notified of by the digital certificate applicant and notifies the digital certificate applicant of the information of the new digital certificate upon determining that the digital certificate applicant needs to apply for the new digital certificate, or notifies the digital certificate applicant of invalid digital certificate information upon determining that the digital certificate applicant does not need to apply for any new digital certificate; and The digital certificate applicant determines, from the notification of the digital certificate issuer, the digital certificate for use.

With the method for automatically applying for a digital certificate according to the embodiment of the invention, a digital certificate can be automatically applied for, updated and issued, and when the digital certificate applicant does not possess any digital certificate issued by the digital certificate issuer, different types of wireless local area network digital certificates can be automatically applied for, or when the digital certificate applicant does not possess any digital certificate or the issued digital certificate is invalid, if a certificate is allowed by a local certificate issuance policy to be issued to the digital certificate applicant, then the digital certificate issuer automatically determines a certificate status of the digital certificate applicant and issues a valid digital certificate to the digital certificate applicant; otherwise, invalid digital certificate information is transmitted, thereby automatically applying for, updating and issuing a digital certificate so as to ensure the effectively working of security mechanism of the wireless local area network technology.

Messages and schemes in which the digital certificate applicant exchanges information with the digital certificate issuer in the embodiment of the invention will not be limited to any particular messages and schemes as long as the information can be exchanged to automatically apply for, update and issue a digital certificate without departing from the spirit of the invention, and preferred message exchange schemes of the invention will be given below.

First Embodiment

The present embodiment provides a preferred message exchange scheme, and as illustrated in FIG. 1, a method for automatically applying for a digital certificate particularly includes the following operations:

In the operation 101, a digital certificate applicant firstly transmits a digital certificate generation capability message to a digital certificate issuer, where the digital certificate generation capability message includes digital certificate generation schemes supported by the digital certificate applicant;

In the operation 102, the digital certificate issuer selects one of the digital certificate generation schemes supported by the digital certificate applicant and notifies the digital certificate applicant of the selected digital certificate generation scheme in a digital certificate generation type message;

In the operation 103, the digital certificate applicant transmits a digital certificate application message to the digital certificate issuer, where if the digital certificate applicant determines that a digital certificate issued by the digital certificate issuer has been possessed, then the digital certificate application message carries information of the digital certificate possessed by the digital certificate applicant, or if the digital certificate applicant determines that no digital certificate issued by the digital certificate issuer is possessed, then the digital certificate application message carries certificate information to be included in a applied new digital certificate;

In the operation 104, the digital certificate issuer transmits a digital certificate acknowledgement message to the digital certificate applicant, where when the digital certificate issuer determines that the digital certificate applicant needs to apply for a new digital certificate, the digital certificate acknowledgement message includes information of the new digital certificate, which is generated by the digital certificate issuer according to the certificate information included in the digital certificate application message and the selected digital certificate generation scheme, or when the digital certificate issuer determines that the digital certificate applicant does not need to apply for any new digital certificate, the digital certificate acknowledgement message carries invalid digital certificate information; and In the operation 105, the digital certificate applicant receives the digital certificate acknowledgment message transmitted from the digital certificate issuer and determines from the digital certificate acknowledgment message the digital certificate for use.

In the present embodiment, information is exchanged by the four messages to automatically apply for, update and issue a digital certificate.

Preferably in the operation 103, when the digital certificate applicant determines that the digital certificate issued by the digital certificate issuer has been possessed, a signature on the information of the possessed digital certificate using a private key of the possessed digital certificate is transmitted in the digital certificate application message together with the information of the possessed digital certificate; and Upon determining that the certificate information to be included by the digital certificate applicant in the applied new digital certificate has been received, or upon determining that the information of the digital certificate possessed by the digital certificate applicant and the signature have been received and that the signature has been verified to be invalid, the digital certificate issuer determines that the digital certificate applicant needs to apply for a new digital certificate; or upon determining that the information of the digital certificate possessed by the digital certificate applicant and the signature have been received and that the signature has been verified to be valid, the digital certificate issuer determines that the digital certificate applicant does not need to apply for any new digital certificate.

Stated otherwise, the digital certificate issuer issues the new digital certificate to the digital certificate applicant in the following two scenarios when a certificate is allowed by the local certificate issuance policy to be issued to the digital certificate applicant:

1) The digital certificate applicant does not possess any digital certificate issued by the digital certificate issuer and thus applies for the digital certificate; and 2) The digital certificate applicant possesses the digital certificate issued by the digital certificate issuer, but the digital certificate is an invalid digital certificate, so the digital certificate is updated.

In order to implement the method according to the embodiment of the invention, particular fields included the messages exchanged by the digital certificate applicant and the digital certificate issuer will not be limited to any particular fields, as long as the information can be exchanged therein, and preferably the following scheme according to an embodiment below of the invention is applicable.

Figure 2:
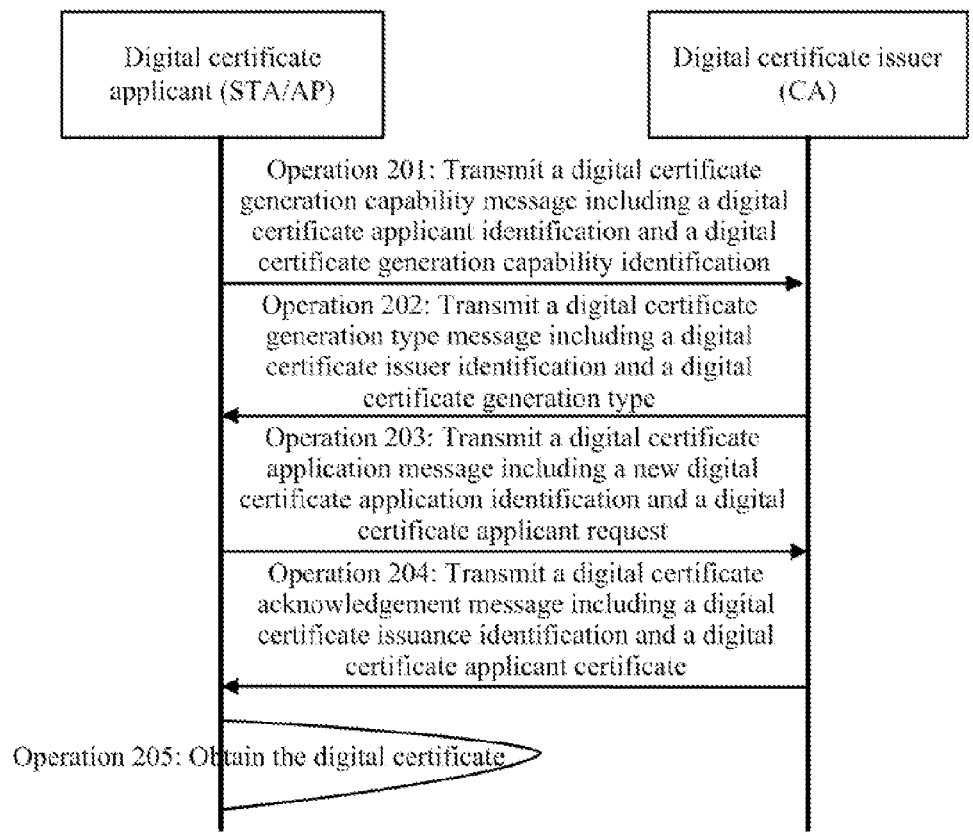
FIG. 2 is a schematic diagram of message contents in the method for automatically applying the digital certificate according to the first embodiment of the invention.

As illustrated in FIG. 2, a method for automatically applying for a digital certificate in the present embodiment includes:

In the operation 201, a digital certificate applicant transmits a digital certificate generation capability message to a digital certificate issuer, where the digital certificate generation capability message includes a digital certificate applicant identification field and a digital certificate generation capability identification field.

Preferably the digital certificate generation capability message further includes a digital certificate applicant random number.

The digital certificate applicant identification field identifies the identity of the digital certificate applicant, and the digital certificate generation capability identification field identifies digital certificate generation schemes supported by the digital certificate applicant, and preferably the digital certificate generation capability identification field lists all the digital certificate generation schemes supported by the digital certificate applicant.

In the present embodiment, the digital certificate generation capability identification field identifies the digital certificate generation schemes as depicted in Table 1 below without any limitation thereto:

TABLE 1

Digital Certificate Generation Capability Identification Field

| Value | Identification bits | Meaning |
|---|---|---|
| 0x01 | 0000 0001 | a pair of public and private keys locally generated in a single-certificate mode |
| 0x02 | 0000 0010 | P12 issued in the single-certificate mode |
| 0x04 | 0000 0100 | a pair of public and private keys locally generated in a multi-certificate mode |
| 0x08 | 0000 1000 | P12 issued in the multi-certificate mode |
| Other | | Reserved |

Particularly the lowest bit, bit0, being 1 indicates a support of a digital certificate generation scheme for the capability of a pair of public and private keys locally generated in the single-certificate mode, the second lowest bit, bit1, being 1 indicates a support of a digital certificate generation scheme for the capability of P12 issuance in the single-certificate mode, the third lowest bit, bit2, being 1 indicates a support of a digital certificate generation scheme for the capability of a pair of public and private keys locally generated in the multiple-certificate mode, the fourth lowest bit, bit4, being 1 indicates a support of a digital certificate generation scheme for the capability of P12 issuance in the multiple-certificate mode. When a plurality of capabilities are supported, identification bits of all the corresponding capability take the value 1, for example, the value of 0x03, i.e., 00000011, indicates a support of both the digital certificate generation scheme for the capability of a pair of public and private keys locally generated in the single-certificate mode and the digital certificate generation scheme for the capability of P12 issuance in the single-certificate mode. The digital certificate applicant indicates the supported digital certificate generation schemes by the value of the digital certificate generation capability identification field, to thereby allow the digital certificate issuer to select one of the digital certificate generation schemes.

In the operation 202, the digital certificate issuer creates and transmits to the digital certificate applicant a digital certificate generation type message upon reception of the digital certificate generation capability message, where the digital certificate generation type message includes a digital certificate issuer identification field and a digital certificate generation type field.

Preferably the digital certificate generation type message further includes a digital certificate issuer random number.

The digital certificate issuer identification field identifies the identity of the digital certificate issuer, and the digital certificate generation type field identifies a digital certificate generation scheme selected by the digital certificate issuer. Particularly upon reception of the digital certificate generation capability message transmitted from the digital certificate applicant, the digital certificate issuer determines a digital certificate generation scheme for use in current digital certificate issuance according to a digital certificate generation scheme supported by both the digital certificate applicant and the digital certificate issuer, or according to a local policy, and identifies the determined digital certificate generation scheme in the digital certificate generation type field.

In the present embodiment, the digital certificate generation type field identifies the selected digital certificate generation scheme as depicted in Table 2 below without any limitation thereto:

TABLE 2

Digital Certificate Generation Type Field

| Value | Identification bits | Meaning |
|---|---|---|
| 0x01 | 0000 0001 | a pair of public and private keys locally generated in the single-certificate mode |
| 0x02 | 0000 0010 | P12 issued in the single-certificate mode |
| 0x04 | 0000 0100 | a pair of public and private keys locally generated in the multi-certificate mode |
| 0x08 | 0000 1000 | PI2 issued in the multi-certificate mode |
| Other | | Reserved |

The lowest bit, bit0, being 1 indicates the selection of the digital certificate generation scheme for the capability of a pair of public and private keys locally generated in the single-certificate mode, the second lowest bit, bit1, being 1 indicates the selection of the digital certificate generation scheme for the capability of P12 issuance in the single-certificate mode, the third lowest bit, bit2, being 1 indicates the selection of the digital certificate generation scheme for the capability of a pair of public and private keys locally generated in the multiple-certificate mode, the fourth lowest bit, bit4, being 1 indicates the selection of the digital certificate generation scheme for the capability of P12 issuance in the multiple-certificate mode. The digital certificate issuer indicates the selected digital certificate generation scheme, i.e., the digital certificate generation type, by the value of the digital certificate generation type field to instruct the digital certificate applicant to use the same digital certificate generation type.

In the operation 203, the digital certificate applicant transmits a digital certificate application message to the digital certificate issuer upon reception of the digital certificate generation type message, where the digital certificate application message particularly includes a new digital certificate application identification field and a digital certificate applicant request field.

Preferably the digital certificate generation type message further carries a check value for an integrity of a digital certificate application message, which is calculated by encrypting the other contents in the digital certificate application message than the check value for the integrity of the digital certificate application message using a key generated from the digital certificate applicant random number and the digital certificate issuer random number.

Particularly upon reception of the digital certificate generation type message, the digital certificate applicant determines, from the value of the digital certificate generation type field in the digital certificate generation type message, the digital certificate generation scheme for use in current certificate issuance, and judges whether to apply for a new digital certificate particularly as follows and identifies this in the new digital certificate application identification field:

It is judged from the digital certificate issuer identification field in the digital certificate generation type message whether a digital certificate issued by the digital certificate issuer has been possessed, and if the digital certificate applicant has possessed the digital certificate issued by the digital certificate issuer, then the new digital certificate application identification field identifies that there is no need to apply for a new digital certificate, or if the digital certificate applicant does not possess any certificate issued by the digital certificate issuer, then the new digital certificate application identification field identifies that there is need to apply for a new digital certificate.

The new digital certificate application identification field can be in the form depicted in Table 3a but will not be limited thereto.

TABLE 3a

Format of New Digital Certificate Application Identification Field (Boolean)

| Message | Value | Meaning |
|---|---|---|
| Digital certificate application message | TRUE | The digital certificate applicant needs to apply for a certificate from the digital certificate issuer CA. |
| Digital certificate application message | FALSE | The digital certificate applicant does not need to apply for any certificate from the digital certificate issuer CA. |

The digital certificate applicant determines the contents of the digital certificate applicant request field from the identification in the new digital certificate application identification field as follows:

If the new digital certificate application identification field identifies that there is need to apply for a new digital certificate, then the digital certificate applicant request field particularly carries certificate information to be included in the newly applied digital certificate; or if the new digital certificate application identification field identifies that there is no need to apply for a new digital certificate, which indicates that the certificate issued by the digital certificate issuer has been possessed, then the digital certificate applicant request field particularly carries information of the digital certificate possessed by the digital certificate applicant and a signature on the information of the possessed digital certificate using a private key of the possessed digital certificate, so that the digital certificate issuer judges, from the information of the digital certificate possessed by the digital certificate applicant and the signature, whether the digital certificate possessed by the digital certificate applicant is valid.

Preferably the digital certificate applicant request field includes a certificate information field and a signature value field as depicted in Table 4.

When the digital certificate applicant determines that the digital certificate issued by the digital certificate issuer is not possessed, that is, there is need to apply for a digital certificate from the digital certificate issuer, then the certificate information field particularly carries the certificate information to be included by the digital certificate applicant in the applied new digital certificate, and the signature value field is invalid; and When the digital certificate applicant determines that the digital certificate issued by the digital certificate issuer has been possessed, that is, there is no need to apply for a digital certificate from the digital certificate issuer, then the certificate information field particularly carries the information of the digital certificate possessed by the digital certificate applicant, and the signature value field carries the signature on the information of the possessed digital certificate using the private key of the possessed digital certificate.

The digital certificate applicant creates a digital certificate application message and transmits it to the digital certificate issuer, where the digital certificate application message includes a new digital certificate application identification field (see Table 3a) and a digital certificate applicant request field (see Table 4).

TABLE 4

| Format of Digital Certificate Applicant Request Field | |
| --- | --- |
| Certificates information | Signature value |

In the operation 204, upon reception of the digital certificate application message, if the digital certificate application message carries a check value for the integrity of the digital certificate application message, then the digital certificate issuer firstly judges whether the check value for the integrity of the digital certificate application message is correct, and if not, then the message is discarded; otherwise, a digital certificate acknowledgement message is transmitted to the digital certificate applicant; or if the digital certificate application message does not carry any check value for the integrity of the digital certificate application message, then a digital certificate acknowledgement message is transmitted to the digital certificate applicant, where the digital certificate acknowledgement message particularly includes a new digital certificate issuance identification field and a digital certificate applicant certificate field.

Preferably the digital certificate acknowledgement message further includes a check value for the integrity of the digital certificate acknowledgement message, which is calculated by encrypting other contents in the digital certificate acknowledgement message than the check value for the integrity of the digital certificate acknowledgement message using the key generated from the digital certificate applicant random number and the digital certificate issuer random number.

When a certificate is allowed by a local certificate issuance policy to be issued to the digital certificate applicant and the digital certificate issuer determines that the digital certificate applicant needs to apply for a new digital certificate, the new digital certificate issuance identification field identifies the issuance of the new digital certificate, and the digital certificate applicant certificate field particularly carries the information of the new digital certificate; and When a certificate is allowed by the local certificate issuance policy to be issued to the digital certificate applicant and the digital certificate issuer determines that the digital certificate applicant does not need to apply for any new digital certificate, or when no certificate is allowed by the local certificate issuance policy to be issued to the digital certificate applicant, the new digital certificate issuance identification field identifies no issuance of a new digital certificate, and the digital certificate applicant certificate field is invalid.

Preferably when a certificate is allowed by the local certificate issuance policy of the digital certificate issuer to be issued to the digital certificate applicant, it is judged as follows whether to issue a new digital certificate to the digital certificate applicant:

It is judged from the new digital certificate application identification field in the digital certificate application message whether the digital certificate applicant has possessed a certificate issued by the digital certificate issuer, and if the digital certificate applicant does not possess any certificate issued by the digital certificate issuer, then the new digital certificate issuance identification field is set to identify that there is a new digital certificate to be issued, or if the digital certificate applicant has possessed the certificate issued by the digital certificate issuer, then the digital certificate issuer judges, from the information of the digital certificate possessed by the digital certificate applicant and the signature in the digital certificate applicant request field, whether the digital certificate possessed by the digital certificate applicant is valid; and if the information of the digital certificate possessed by the digital certificate applicant in the digital certificate applicant request field is valid, which indicates that the digital certificate applicant has possessed the valid digital certificate, then the new digital certificate issuance identification field is set to identify that there is no new digital certificate to be issued; or if the information of the digital certificate possessed by the digital certificate applicant in the digital certificate applicant request field is invalid, which indicates that the digital certificate applicant does not possess any valid digital certificate, then the new digital certificate issuance identification field is set to identify that there is a new digital certificate to be issued.

The new digital certificate issuance identification field can be in the form depicted in Table 3b but will not be limited thereto.

TABLE 3b

| Format of New Digital Certificate Issuance Identification Field (Boolean) | | |
| --- | --- | --- |
| Message | Value | Meaning |
| Digital certificate acknowledgement message | TRUE | The digital certificate issuer CA issues a certificate to the digital certificate applicant. |
| Digital certificate acknowledgement message | FALSE | The digital certificate issuer CA issues no certificate to the digital certificate applicant. |

The contents of the digital certificate applicant certificate field are determined from the identification in the new digital certificate issuance identification field as follows:

If the new digital certificate issuance identification field identifies that there is a new digital certificate to be issued, then the digital certificate applicant certificate field carries the newly issued digital certificate, and the value of the digital certificate applicant certificate field is valid, where the value of the field is a digital certificate applicant certificate generated from the certificate information included in the digital certificate applicant request field of the digital certificate application message and the selected digital certificate generation scheme; or if the new digital certificate issuance identification field identifies that there is no new digital certificate to be issued, which indicates that the digital certificate applicant has possessed the valid digital certificate issued by the digital certificate issuer, then the value of the digital certificate applicant certificate field identifies invalidity.

When the value of the digital certificate applicant certificate field is valid, the digital certificate applicant certificate field includes a number of certificates field and a digital certificate field as depicted in Table 5.

TABLE 5

Format of Digital Certificate Applicant Certificate Field

| The number of certificates | Digital certificates |
|---|---|

The first section is the number of certificates, which indicates the number of issued certificates in total and is dependent upon the selected digital certificate generation scheme.

The second section is the digital certificates, which indicates the format of the issued digital certificate and is dependent upon the selected digital certificate generation scheme.

Preferably the digital certificates field particularly includes certificate type, certificate identifier, length and value fields as depicted in Table 6.

TABLE 6

Format of Digital Certificate Field

| Certificate type | Certificates Identification | Length | Value |
|---|---|---|---|

The first sub-field is the certificate type, as depicted in Table 7 where the certificate type of the issued new digital certificate is listed.

TABLE 7

Format of Certificate Type Sub-field

| Value | Meaning |
|---|---|
| 0x00 | AS certificate |
| 0x01 | AP certificate |
| 0x02 | STA certificate |
| 0x03 | CA certificate |
| 0x04-FF | Reserved |

The second sub-field is the certificate identification, as depicted in Table 8 where an encoding scheme of the new digital certificate is listed.

TABLE 8

Format of Certificate Identification Sub-field

| Value | Meaning |
|---|---|
| 0x00 | X.509 v3 certificate |
| 0x01 | GBW certificate |
| 0x02 | P12 certificate |
| 0x03-FF | Reserved |

The third sub-field is the length, which indicates the length of the "value" sub-field, i.e., the length of the contents of the new digital certificate.

The fourth sub-field is the value, which fully identifies the certificate contents of the new digital certificate.

In the operation 205, if the digital certificate acknowledgement message carries the check value for the integrity of the digital certificate acknowledgement message, then the digital certificate applicant firstly judges whether the check value for the integrity of the digital certificate acknowledgement message in the received digital certificate acknowledgement message is correct, and if not, then the message is discarded; otherwise, the message is processed to obtain the digital certificate for use; or if the digital certificate acknowledgement message does not carry any check value for the integrity of the digital certificate acknowledgement message, then the digital certificate applicant determines from the digital certificate acknowledgement message the digital certificate for use.

Preferably the digital certificate applicant judges from the new digital certificate issuance identification field whether the digital certificate applicant certificate field includes a new digital certificate issued by the digital certificate issuer, and if the new digital certificate issuance identification field identifiers the issuance of the new digital certificate, then the digital certificate applicant installs the new digital certificate included in the digital certificate applicant certificate field; or if the new digital certificate issuance identification field identifies that there is no new digital certificate to be issued, then the digital certificate applicant continues with the use of the possessed digital certificate issued by the digital certificate issuer.

It shall be noted that the correspondence relationship between the value, the identification bits and the meaning depicted in Tables 1 and 2, the correspondence relationship between the message, the value and the meaning depicted in Tables 3a and 3b, and the correspondence relationship between the value and the meaning depicted in Tables 7 and 8 are merely exemplary and can be adapted as needed in a practical implementation. For example, the value "0x00" in Table 7 can be adapted to correspond to the meaning "AP certificate", and the value "0x00" can be adapted to correspond to the meaning "AS certificate"; and the order of the fields in Tables 4 to 6 can be adapted as needed in practice, for example, "the number of certificates" and "digital certificates" in Table 5 can be swapped.

It shall be noted that the process flow in FIG. 2 above is merely a preferred implementation. As described above, the fields included in the messages exchanged by the digital certificate applicant and the digital certificate issuer will not be limited to any particular fields as long as the information can be exchanged. Thus when the digital certificate application message particularly includes the new digital certificate application identification field and the digital certificate applicant request field, the fields in the other three messages can be other fields than the fields listed above; when the digital certificate acknowledgement message particularly includes the new digital certificate issuance identification field and the digital certificate applicant certificate field, the fields in the other three messages can also be other fields than the fields listed above; when the digital certificate generation capability message includes the digital certificate applicant identification field and the digital certificate generation capability identification field, the fields in the other three messages can also be other fields than the fields listed above; and when the digital certificate generation type message includes the digital certificate issuer identification field and the digital certificate generation type field, the fields in the other three messages can also be other fields than the fields listed above.

Second Embodiment

Figure 3:
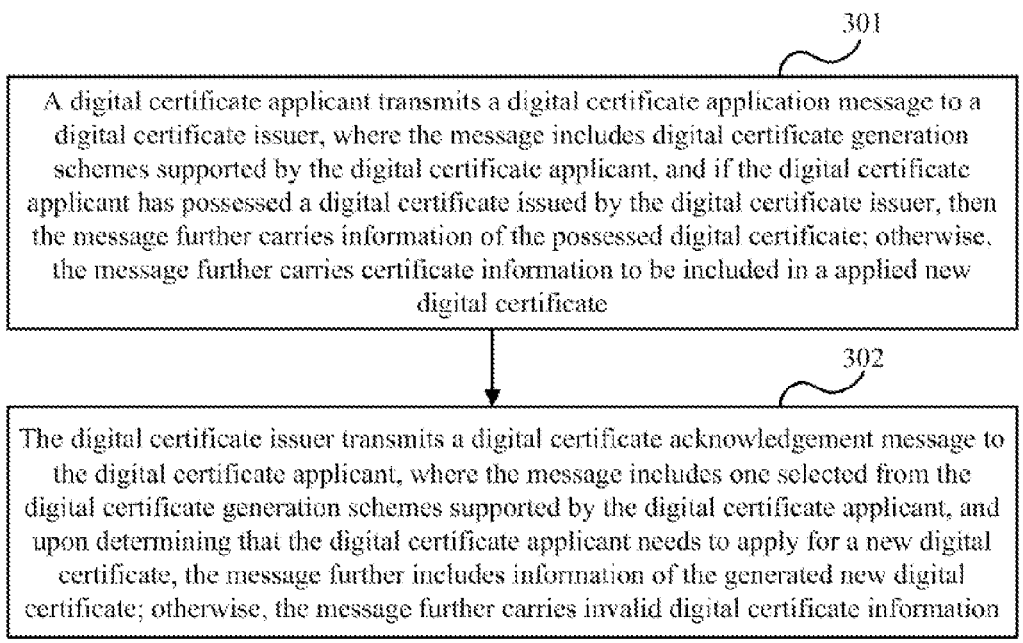
FIG. 3 is a flow chart of a method for automatically applying for a digital certificate according to a second embodiment of the invention.

The present embodiment relates to a preferred message exchange scheme, and as illustrated in FIG. 3, a method for automatically applying for a digital certificate particularly includes the following operations:

In the operation 301, a digital certificate applicant firstly transmits a digital certificate application message to a digital certificate issuer;

The digital certificate application message includes digital certificate generation schemes supported by the digital certificate applicant, and if the digital certificate applicant determines that a digital certificate issued by the digital certificate issuer has been possessed, then the digital certificate application message further carries information of the digital certificate possessed by the digital certificate applicant; or if the digital certificate applicant determines that no digital certificate issued by the digital certificate issuer has been possessed, then the digital certificate application message further carries certificate information to be included in a applied new digital certificate;

In the operation 302, the digital certificate issuer transmits a digital certificate acknowledgement message to the digital certificate applicant;

The digital certificate acknowledgement message includes a digital certificate generation scheme selected by the digital certificate issuer from the digital certificate generation schemes supported by the digital certificate applicant, and when the digital certificate issuer determines that the digital certificate applicant needs to apply for a new digital certificate, the digital certificate acknowledgement message further includes information of the new digital certificate generated by the digital certificate issuer from the selected digital certificate generation scheme and the certificate information included in the digital certificate application message, or when the digital certificate issuer determines that the digital certificate applicant does not need to apply for any new digital certificate, the digital certificate acknowledgement message further carries invalid digital certificate information; and In the operation 303, the digital certificate applicant receives the digital certificate acknowledgement message transmitted from the digital certificate issuer and determines from the digital certificate acknowledgement message the digital certificate for use.

In the present embodiment, the two messages are exchanged to automatically apply for, update and issue a digital certificate.

As compared with the first embodiment, in the present embodiment, the operation 201 and the operation 203 in the first embodiment are combined into the operation 301 so that the digital certificate applicant transmits only one message to the digital certificate issuer, and the operation 202 and the operation 204 in the first embodiment are combined into the operation 302 so that the digital certificate issuer transmits only one message to the digital certificate applicant.

Figure 4:
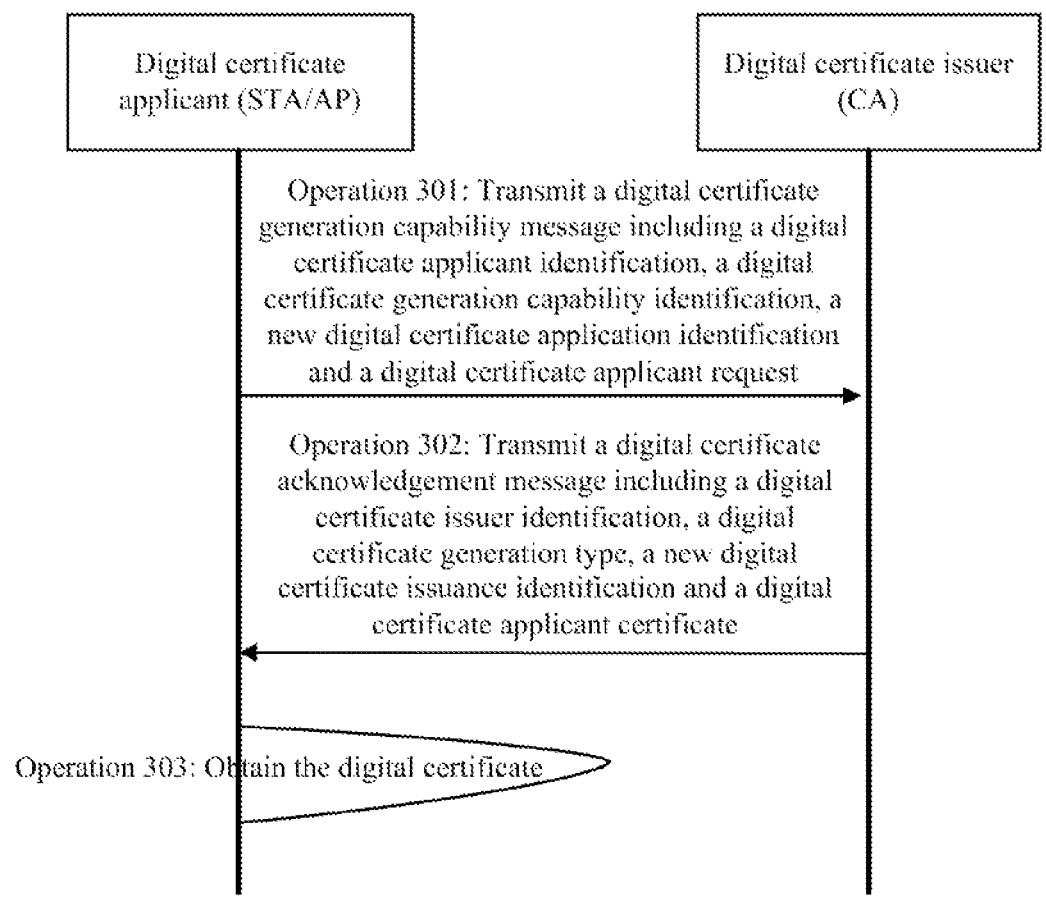
FIG. 4 is a schematic diagram of message contents in the method for automatically applying for the digital certificate according to the second embodiment of the invention.

When the operation 201 and the operation 203 in the first embodiment are combined into the operation 301, in the operation 301 in the present embodiment as illustrated in FIG. 4, the digital certificate applicant transmits the digital certificate application message to the digital certificate issuer, where the digital certificate application message particularly includes the digital certificate applicant identification field, the digital certificate generation capability identification field, the new digital certificate application identification field and the digital certificate applicant request field and can further includes the digital certificate applicant random number, but does not include any check value for the integrity of the digital certificate application message. Reference can be made to the description of the first embodiment for details of the respective fields above, so a repeated description thereof will be omitted here.

When the operation 202 and the operation 204 in the first embodiment are combined into the operation 302, in the operation 302 in the present embodiment as illustrated in FIG. 4, the digital certificate issuer transmits the digital certificate acknowledgement message to the digital certificate applicant upon reception of the digital certificate application message, where the digital certificate acknowledgement message particularly includes the digital certificate issuer identification field, the digital certificate generation type field, the new digital certificate issuance identification field and the digital certificate applicant certificate field and can further include the digital certificate issuer random number and the check value for the integrity of the digital certificate acknowledgement message. Reference can be made to the description of the first embodiment for details of the respective fields above, so a repeated description thereof will be omitted here. The check value for the integrity of the digital certificate acknowledgement message is calculated by encrypting the other contents in the digital certificate acknowledgement message than the check value for the integrity of the digital certificate acknowledgement message using the key generated from the digital certificate applicant random number and the digital certificate issuer random number; and upon reception of the digital certificate acknowledgement message, the digital certificate applicant determines that the check value for the integrity of the digital certificate acknowledgement message is correct, and then determines from the digital certificate acknowledgement message the digital certificate for use.

There are other technical features in the second embodiment which are the same or similar to those in the first embodiment as exemplified below. It shall be noted that reference can be made to the first embodiment for details of the respective technical features, so a repeated description thereof will be omitted here.

The digital certificate applicant transmits the signature on the information of the possessed digital certificate using the private key of the possessed digital certificate together with the information of the possessed digital certificate upon determining that the digital certificate issued by the digital certificate issuer has been possessed;

The digital certificate issuer determines that the digital certificate applicant needs to apply for a new digital certificate upon determining that the certificate information to be included by the digital certificate applicant in the applied new digital certificate has been received or upon determining that the information of the digital certificate possessed by the digital certificate applicant and the signature have been received and that the signature has been verified to be invalid; and The digital certificate issuer determines that the digital certificate applicant does not need to apply for any new digital certificate upon determining that the information of the digital certificate possessed by the digital certificate applicant and the signature have been received and that the signature has been verified to be valid.

Based upon the same inventive idea, embodiments of the invention further provide an automatic digital certificate application device, a digital certificate issuing device and an automatic digital certificate application system, and since the devices and the system address the problem under a similar principle to the method for automatically applying for a digital certificate, reference can be made to the implementation of the method for implementations of the devices and the system, so a repeated description thereof will be omitted here.

A digital certificate application device according to an embodiment of the invention includes:

A first notification unit is configured to notify a digital certificate issuer of digital certificate generation schemes supported by the digital certificate application device;

A second notification unit is configured, upon determining that the digital certificate application device has possessed a digital certificate issued by the digital certificate issuer, to notify the digital certificate issuer of information of the digital certificate possessed by the digital certificate application device, or upon determining that the digital certificate application device possesses no digital certificate issued by the digital certificate issuer, to notify the digital certificate issuer of certificate information to be included in a applied new digital certificate; and A certificate determination unit is configured to determine from a notification of the digital certificate issuer a digital certificate for use.

A digital certificate issuing device according to an embodiment of the invention includes:

A first notification unit is configured to select one of digital certificate generation schemes, supported by a digital certificate applicant, notified of by the digital certificate applicant and to notify the digital certificate applicant of the selected digital certificate generation scheme; and A second notification unit is configured to generate information of a new digital certificate from the selected digital certificate generation scheme and certificate information notified of by the digital certificate applicant and notify the digital certificate applicant of the information of the new digital certificate upon determining that the digital certificate applicant needs to apply for the new digital certificate, and to notify the digital certificate applicant of invalid digital certificate information upon determining that the digital certificate applicant does not need to apply for any new digital certificate.

An automatic digital certificate application system according to an embodiment of the invention includes:

A digital certificate applicant is configured to notify a digital certificate issuer of digital certificate generation schemes supported by the digital certificate applicant, if it is determined that a digital certificate issued by the digital certificate issuer has been possessed, to further notify the digital certificate issuer of information of the digital certificate possessed by the digital certificate applicant, or if it is determined that no digital certificate issued by the digital certificate issuer has been possessed, to further notify the digital certificate issuer of certificate information to be included in a applied new digital certificate, and to determine from a notification of the digital certificate issuer a digital certificate for use; and The digital certificate issuer is configured to select one of the digital certificate generation schemes supported by the digital certificate applicant and notify the digital certificate applicant of the selected digital certificate generation scheme, and to generate information of the new digital certificate from the selected digital certificate generation scheme and the certificate information notified of by the digital certificate applicant and notify the digital certificate applicant of the information of the new digital certificate upon determining that the digital certificate applicant needs to apply for the new digital certificate, or to notify the digital certificate applicant of invalid digital certificate information upon determining that the digital certificate applicant does not need to apply for any new digital certificate.

Preferably the digital certificate applicant is a station STA, an Access Point (AP) or another device, and the digital certificate issuer is a Certificate Authority (CA).

The invention provides a digital certificate application method and system for automatically applying for, updating and issuing a digital certificate based on a digital certificate security mechanism in a network environment, the solution is implemented by exchanging the same set of messages:

1) A digital certificate applicant automatically applies for different types of wireless local area network digital certificates;

2) The digital certificate applicant automatically updates different types of wireless local area network digital certificates; and 3) A digital certificate issuer automatically determines a certificate status of the digital certificate applicant and issues a digital certificate to the digital certificate applicant.

The digital certificate applicant according to the invention can be the digital certificate application device or can be any entity including the digital certificate application device. e.g., a network access point, a terminal device, etc.; and the digital certificate issuer can be the digital certificate issuing device or can be any entity including the digital certificate issuing device, e.g., a digital certificate server, etc.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for automatically applying for a digital certificate, comprising:
   notifying, by a digital certificate applying device, a digital certificate issue device of digital certificate generation schemes supported by the digital certificate applying device, and if the digital certificate applying device determines that a digital certificate issued by the digital certificate issue device has been possessed, then the digital certificate applying device further notifying the digital certificate issue device of information of the digital certificate possessed by the digital certificate applying device, or if the digital certificate applying device determines that no digital certificate issued by the digital certificate issue device has been possessed, then the digital certificate applying device further notifying the digital certificate issue device of certificate information to be included in an applied new digital certificate;
   selecting, by the digital certificate issue device, one of the digital certificate generation schemes supported by the digital certificate applying device and notifying the digital certificate applying device of the selected digital certificate generation scheme, and generating, by the digital certificate issue device, information of the new digital certificate according to the selected digital certificate generation scheme and the certificate information notified by the digital certificate applying device and notifying the digital certificate applying device of the information of the new digital certificate upon determining that the digital certificate applying device needs to apply for the new digital certificate, or notifying the digital certificate applying device of invalid digital certificate information upon determining that the digital certificate applying device does not need to apply for any new digital certificate; and
   determining, by the digital certificate applying device, a digital certificate for use according to the notification from the digital certificate issue device.

2. The method according to claim 1, wherein:
   the digital certificate applying device firstly transmits a digital certificate application message to the digital certificate issue device, wherein the digital certificate application message comprises the digital certificate generation schemes supported by the digital certificate applying device, and if the digital certificate applying device determines that the digital certificate issued by the digital certificate issue device has been possessed, then the digital certificate application message further carries the information of the digital certificate possessed by the digital certificate applying device, or if the digital certificate applying device determines that no digital certificate issued by the digital certificate issue device has been possessed, then the digital certificate application message further carries the certificate information to be included in the applied new digital certificate;
   the digital certificate issue device transmits a digital certificate acknowledgement message to the digital certificate applying device, wherein the digital certificate acknowledgement message comprises the digital certificate generation scheme selected by the digital certificate issue device from the digital certificate generation schemes supported by the digital certificate applying device, and when the digital certificate issue device determines that the digital certificate applying device needs to apply for a new digital certificate, the digital certificate acknowledgement message further comprises information of the new digital certificate generated by the digital certificate issue device from the selected digital certificate generation scheme and the certificate information comprised in the digital certificate application message; or when the digital certificate issue device determines that the digital certificate applying device does not need to apply for any new digital certificate, the digital certificate acknowledgement message further carries invalid digital certificate information; and
   the digital certificate applying device receives the digital certificate acknowledgment message transmitted from the digital certificate issue device and determines from the digital certificate acknowledgment message the digital certificate for use.

3. The method according to claim 1, wherein:
   the digital certificate applying device firstly transmits a digital certificate generation capability message to the digital certificate issue device, wherein the digital certificate generation capability message comprises the digital certificate generation schemes supported by the digital certificate applying device; the digital certificate issue device selects one of the digital certificate generation schemes supported by the digital certificate applying device and notifies the digital certificate applying device of the selected digital certificate generation scheme in a digital certificate generation type message;
   the digital certificate applying device transmits a digital certificate application message to the digital certificate issue device, wherein if the digital certificate applying device determines that the digital certificate issued by the digital certificate issue device has been possessed, then the digital certificate application message carries the information of the digital certificate possessed by the digital certificate applying device, or if the digital certificate applying device determines that no digital certificate issued by the digital certificate issue device has been possessed, then the digital certificate application message carries the certificate information to be included in the applied new digital certificate;
   the digital certificate issue device transmits a digital certificate acknowledgement message to the digital certificate applying device, wherein when the digital certificate issue device determines that the digital certificate applying device needs to apply for a new digital certificate, the digital certificate acknowledgement message comprises information of the new digital certificate generated by the digital certificate issue device from the selected digital certificate generation scheme and the certificate information comprised in the digital certificate application message, or when the digital certificate issue device determines that the digital certificate applying device does not need to apply for any new digital certificate, the digital certificate acknowledgement message carries invalid digital certificate information; and the digital certificate applying device receives the digital certificate acknowledgment message transmitted from the digital certificate issue device and determines from the digital certificate acknowledgment message the digital certificate for use.

4. The method according to claim 2, wherein:

when the digital certificate applying device determines that the digital certificate issued by the digital certificate issue device has been possessed, the digital certificate applying device transmits a signature on the information of the possessed digital certificate using a private key of the possessed digital certificate together with the information of the possessed digital certificate; and the digital certificate issue device determines that the digital certificate applying device needs to apply for a new digital certificate upon determining that the certificate information to be included by the digital certificate applying device in the applied new digital certificate has been received, or upon determining that the information of the digital certificate possessed by the digital certificate applying device and the signature have been received and that the signature has been verified to be invalid; or the digital certificate issue device determines that the digital certificate applying device does not need to apply for any new digital certificate upon determining that the information of the digital certificate possessed by the digital certificate applying device and the signature have been received and that the signature has been verified to be valid.

5. The method according to claim 4, wherein the digital certificate application message particularly comprises a new digital certificate application identification field and a digital certificate applying device request field; and when the digital certificate applying device determines that no digital certificate issued by the digital certificate issue device is possessed, the new digital certificate application identification field identifies that there is a new digital certificate to be needed, and the digital certificate applying device request field particularly carries the certificate information to be included by the digital certificate applying device in the applied new digital certificate; or when the digital certificate applying device determines that the digital certificate issued by the digital certificate issue device has been possessed, the new digital certificate application identification field identifies that there is no new digital certificate to be needed, and the digital certificate applying device request field particularly carries the information of the possessed digital certificate by the digital certificate applying device and the signature on the information of the possessed digital certificate using the private key of the possessed digital certificate.

6. The method according to claim 5, wherein the digital certificate applying device request field comprises a certificate information field and a signature value field; and when the digital certificate applying device determines that no digital certificate issued by the digital certificate issue device has been possessed, the certificate information field particularly carries the certificate information to be included by the digital certificate applying device in the applied new digital certificate, and the signature value field is invalid; or when the digital certificate applying device determines that the digital certificate issued by the digital certificate issue device has been possessed, the certificate information field particularly carries the information of the digital certificate possessed by the digital certificate applying device, and the signature value field carries the signature on the information of the possessed digital certificate using the private key of the possessed digital certificate.

7. The method according to claim 2, wherein the digital certificate acknowledgement message particularly comprises a new digital certificate issuance identification field and a digital certificate applying device certificate field; and when the digital certificate issue device determines that the digital certificate applying device needs to apply for a new digital certificate, the new digital certificate issuance identification field identifies an issuance of the new digital certificate, and the digital certificate applying device certificate field particularly carries the information of the new digital certificate; or when the digital certificate issue device determines that the digital certificate applying device does not need to apply for a new digital certificate, the new digital certificate issuance identification field identifies no issuance of a new digital certificate, and the digital certificate applying device certificate field identifies invalidity.

8. The method according to claim 7, wherein the digital certificate applying device certificate field comprises a number of certificates field and a digital certificate field, and the digital certificate field particularly comprises a certificate type field identifying the type of the new digital certificate, a certificate identification field identifying an encoding scheme of the new digital certificate, a length field identifying a length of contents of the new digital certificate, and a value field identifying the contents of the new digital certificate.

9. The method according to claim 2, wherein the digital certificate generation capability message or the digital certificate application message for notifying of the digital certificate generation schemes supported by the digital certificate applying device particularly comprises a digital certificate applying device identification field and a digital certificate generation capability identification field, and the digital certificate generation capability identification field identifies the digital certificate generation schemes supported by the digital certificate applying device.

10. The method according to claim 2, wherein the digital certificate generation type message or the digital certificate acknowledgement message for notifying the digital certificate generation scheme selected by the digital certificate issue device particularly comprises a digital certificate issue device identification field and a digital certificate generation type field;

the digital certificate generation type field identifies the digital certificate generation scheme selected by the digital certificate issue device; and the digital certificate applying device particularly judges from the digital certificate issue device identification field whether the digital certificate issued by the digital certificate issue device has been possessed.

11. The method according to claim 3, wherein:
the digital certificate applying device further transmits a digital certificate applying device random number generated by the digital certificate applying device to the digital certificate issue device while notifying the digital certificate issue device of the digital certificate generation schemes supported by the digital certificate applying device;
the digital certificate issue device further transmits a digital certificate issue device random number generated by the digital certificate issue device to the digital certificate applying device while notifying the digital certificate applying device of the selected digital certificate generation scheme;
the digital certificate application message transmitted from the digital certificate applying device to the digital certificate issue device further carries a check value for an integrity of digital certificate application message, which is calculated by encrypting other contents in the digital certificate application message than the check value for the integrity of digital certificate application message using a key generated from the digital certificate applying device random number and the digital certificate issue device random number;
upon reception of the digital certificate application message, the digital certificate issue device determines that the check value for the integrity of the digital certificate application message is correct, and then transmits the digital certificate acknowledgement message to the digital certificate applying device, wherein the digital certificate acknowledgement message further comprises a check value for an integrity of the digital certificate acknowledgement message, which is calculated by encrypting other contents in the digital certificate acknowledgement message than the check value for the integrity of the digital certificate acknowledgement message using the key generated from the digital certificate applying device random number and the digital certificate issue device random number; and
upon reception of the digital certificate acknowledgement message, the digital certificate applying device determines that the check value for the integrity of the digital certificate acknowledgement message is correct, and then determines from the digital certificate acknowledgement message the digital certificate for use.

12. The method according to claim 2, wherein:
the digital certificate application message transmitted from the digital certificate applying device to the digital certificate issue device further comprises a digital certificate applying device random number generated by the digital certificate applying device;
upon reception of the digital certificate application message, the digital certificate issue device further transmits the digital certificate acknowledgement message to the digital certificate applying device, wherein the digital certificate acknowledgement message further comprises a digital certificate issue device random number generated by the digital certificate issue device and a check value for an integrity of the digital certificate acknowledgement message, which is calculated by encrypting other contents in the digital certificate acknowledgement message than the check value for the integrity of digital certificate acknowledgement message using the key generated from the digital certificate applying device random number and the digital certificate issue device random number; and
upon reception of the digital certificate acknowledgement message, the digital certificate applying device determines that the check value for the integrity of the digital certificate acknowledgement message is correct, and then determines from the digital certificate acknowledgement message the digital certificate for use.

13. A digital certificate application device, comprising:
a first notification unit configured to notify a digital certificate issue device of digital certificate generation schemes supported by the digital certificate application device;
a second notification unit configured, upon determining that the digital certificate application device has possessed a digital certificate issued by the digital certificate issue device, to notify the digital certificate issue device of information of the digital certificate possessed by the digital certificate application device, or upon determining that the digital certificate application device possesses no digital certificate issued by the digital certificate issue device, to notify the digital certificate issue device of certificate information to be included in an applied new digital certificate; and
a certificate determination unit configured to determine a digital certificate for use according to a notification from the digital certificate issue device.

14. A digital certificate issuing device, comprising:
a first notification unit configured to select one of digital certificate generation schemes, supported by a digital certificate applying device, notified by the digital certificate applying device and to notify the digital certificate applying device of the selected digital certificate generation scheme; and
a second notification unit configured to generate information of a new digital certificate from the selected digital certificate generation scheme and certificate information notified by the digital certificate applying device and notify the digital certificate applying device of the information of the new digital certificate upon determining that the digital certificate applying device needs to apply for a new digital certificate, and to notify the digital certificate applying device of invalid digital certificate information upon determining that the digital certificate applying device does not need to apply for any new digital certificate.

15. The method according to claim 3, wherein:
when the digital certificate applying device determines that the digital certificate issued by the digital certificate issue device has been possessed, the digital certificate applying device transmits a signature on the information of the possessed digital certificate using a private key of the possessed digital certificate together with the information of the possessed digital certificate; and
the digital certificate issue device determines that the digital certificate applying device needs to apply for a new digital certificate upon determining that the certificate information to be included by the digital certificate applying device in the applied new digital certificate has been received, or upon determining that the information of the digital certificate possessed by the digital certificate applying device and the signature have been received and that the signature has been verified to be invalid; or
the digital certificate issue device determines that the digital certificate applying device does not need to apply for any new digital certificate upon determining that the information of the digital certificate possessed by the digital certificate applying device and the signature have been received and that the signature has been verified to be valid.

16. The method according to claim 15, wherein the digital certificate application message particularly comprises a new digital certificate application identification field and a digital certificate applying device request field; and
when the digital certificate applying device determines that no digital certificate issued by the digital certificate issue device is possessed, the new digital certificate application identification field identifies that there is a new digital certificate to be needed, and the digital certificate applying device request field particularly carries the certificate information to be included by the digital certificate applying device in the applied new digital certificate; or
when the digital certificate applying device determines that the digital certificate issued by the digital certificate issue device has been possessed, the new digital certificate application identification field identifies that there is no new digital certificate to be needed, and the digital certificate applying device request field particularly carries the information of the possessed digital certificate by the digital certificate applying device and the signature on the information of the possessed digital certificate using the private key of the possessed digital certificate;
wherein the digital certificate applying device request field comprises a certificate information field and a signature value field; then
when the digital certificate applying device determines that no digital certificate issued by the digital certificate issue device has been possessed, the certificate information field particularly carries the certificate information to be included by the digital certificate applying device in the applied new digital certificate, and the signature value field is invalid; or
when the digital certificate applying device determines that the digital certificate issued by the digital certificate issue device has been possessed, the certificate information field particularly carries the information of the digital certificate possessed by the digital certificate applying device and the signature value field carries the signature on the information of the possessed digital certificate using the private key of the possessed digital certificate.

17. The method according to claim 3, wherein the digital certificate acknowledgement message particularly comprises a new digital certificate issuance identification field and a digital certificate applying device certificate field; and
when the digital certificate issue device determines that the digital certificate applying device needs to apply for a new digital certificate, the new digital certificate issuance identification field identifies an issuance of the new digital certificate, and the digital certificate applying device certificate field particularly carries the information of the new digital certificate; or
when the digital certificate issue device determines that the digital certificate applying device does not need to apply for a new digital certificate, the new digital certificate issuance identification field identifies no issuance of a new digital certificate, and the digital certificate applying device certificate field identifies invalidity.

18. The method according to claim 17, wherein the digital certificate applying device certificate field comprises a number of certificates field and a digital certificate field, and the digital certificate field particularly comprises a certificate type field identifying the type of the new digital certificate, a certificate identification field identifying an encoding scheme of the new digital certificate, a length field identifying a length of contents of the new digital certificate, and a value field identifying the contents of the new digital certificate.

19. The method according to claim 3, wherein the digital certificate generation capability message or the digital certificate application message for notifying of the digital certificate generation schemes supported by the digital certificate applying device particularly comprises a digital certificate applying device identification field and a digital certificate generation capability identification field, and the digital certificate generation capability identification field identifies the digital certificate generation schemes supported by the digital certificate applying device.

20. The method according to claim 3, wherein the digital certificate generation type message or the digital certificate acknowledgement message for notifying the digital certificate generation scheme selected by the digital certificate issue device particularly comprises a digital certificate applying device identification field and a digital certificate generation type field;
the digital certificate generation type field identifies the digital certificate generation scheme selected by the digital certificate applying device; and
the digital certificate applying device particularly judges from the digital certificate issue device identification field whether the digital certificate issued by the digital certificate issue device has been possessed.

* * * * *